July 9, 1963

C. HOROWITZ ETAL 3,096,789

DASH CONTROL PARKING BRAKE VALVE

Filed Jan. 23, 1961

2 Sheets-Sheet 1

INVENTORS.
CHARLES HOROWITZ
HAROLD L. DOBRIKIN
BY Parker & Carter
Attorneys.

3,096,789
DASH CONTROL PARKING BRAKE VALVE
Charles Horowitz, Chicago, and Harold L. Dobrikin, Highland Park, Ill., assignors to Berg Airlectro Products Co., Chicago, Ill., a corporation of Illinois
Filed Jan. 23, 1961, Ser. No. 84,085
1 Claim. (Cl. 137—627.5)

This invention relates to control valves and has particular relation to a valve which may be installed on the dash of a vehicle, for example.

One purpose of the invention is to provide a dash control valve effective to control the application of a parking brake.

Another purpose is to provide a valve for supplying pressure to the fluid pressure braking system of vehicles and the like.

Another purpose is to provide a valve mechanism having means for manual operation thereof.

Another purpose is to provide a control valve mechanism for a fluid pressure system wherein the fluid pressure entering said valve is employed to control elements thereof.

Another purpose is to provide a valve mechanism having a fixed valve seat and a movable valve seat.

Another purpose is to provide a valve mechanism having parts movable between a pressure-transmitting configuration and an exhaust configuration.

Other purposes will appear from time to time during the course of the specification and claims.

Figure 2:
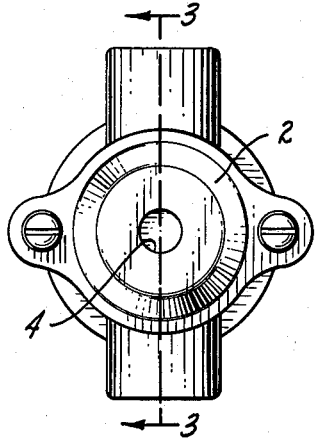
Figure 1:
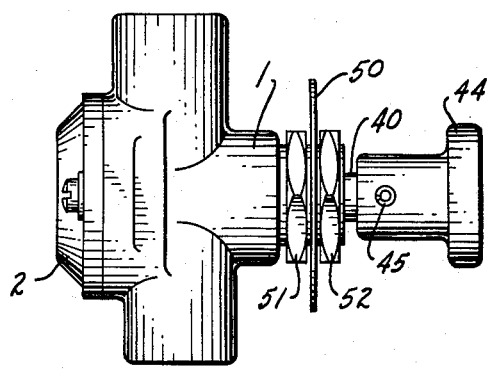
Figure 3:
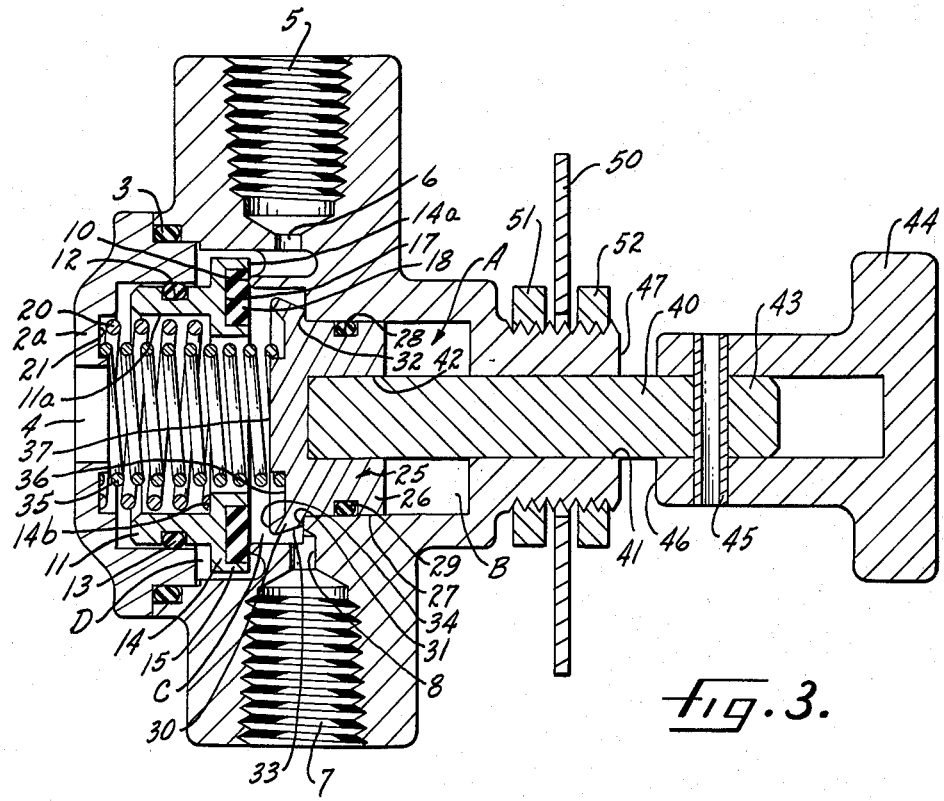
Figure 4:
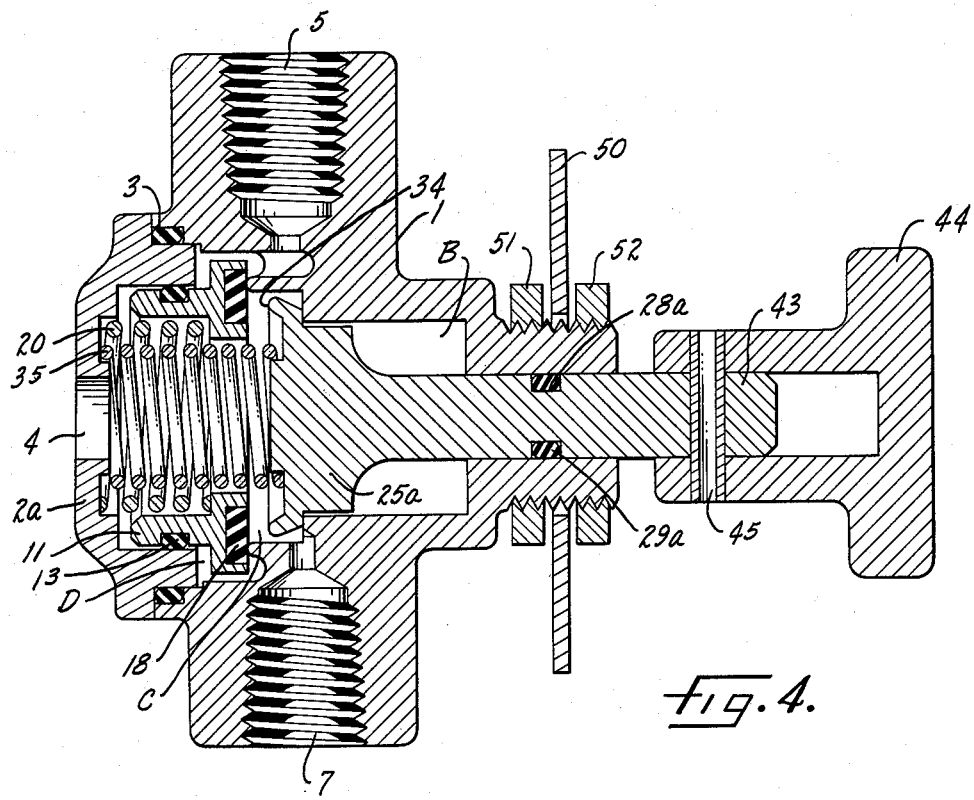

The invention is illustrated more or less diagrammatically in the accompanying drawings, wherein:

FIGURE 1 is a side elevation;
FIGURE 2 is an end elevation;
FIGURE 3 is an axial section, on an enlarged scale, taken on the line 3—3 of FIGURE 2; and
FIGURE 4 is an axial section illustrating a variant form of the invention.

Like parts are indicated by like numerals throughout the specification and drawings.

Referring now to the drawings, the numeral 1 generally illustrates a valve body or housing. The body or housing 1 has a central chamber indicated generally by the letter A. The chamber A has an end portion or sub-chamber B and a larger opposite end portion, or sub-chamber C, communicating with sub-chamber B. The sub-chamber C is open to an end of valve body 1 opposite that occupied by sub-chamber B. A closure member or cap 2 is sealed within and occupies the open end of sub-chamber C, the seal ring 3 being illustrated for this purpose. An exhaust outlet 4 is formed in end cap 2 and communicates with sub-chamber C in axial alignment therewith and at its end opposite to that communicating with sub-chamber B. An annular outward extension of sub-chamber C is positioned intermediate the opposite ends of sub-chamber C between sub-chamber B and exhaust outlet 4, the annular outwardly extending chamber segment being indicated at D.

A fluid pressure inlet 5 is formed in housing or body 1 and communicates, through passage 6, with the annular chamber segment D. A fluid pressure outlet 7 is formed in body 1 and communicates through passage 8 with chamber C at a point immediately adjacent its point of communication with sub-chamber B and between sub-chamber annulus D and sub-chamber B.

A circular valve seat 10 is formed and positioned at that end of chamber annulus D nearest the point of communication between sub-chambers C and B, the seat 10 having a diameter substantially equal to the normal diameter of sub-chamber C and therefore inwardly spaced from the outer diameter of chamber annulus D.

Reciprocable in sub-chamber C is a hollow piston member 11 carrying, in its outer circumferential wall surface, a groove 12 in which a seal 13 is positioned for sealing contact with the inner wall of sub-chamber C between annulus D and the end wall 2a of cap 2 in which exhaust 4 is formed. Carried at the inner end of piston 11 is an outwardly and inwardly extending enlargement 14. The enlargement 14 has an outwardly extending annular flange segment 15 reciprocal within the annulus D and having an outer diameter somewhat less than the outer diameter of annular sub-chamber segment D. The axial extension of segment 15 is less than that of segment D whereby pressure in chamber segment D is exerted equally on opposite sides of segment 15. The enlargement 14 has an inwardly extending annular flange segment 16, the inner diameter of which defines an axial opening axially aligned with exhaust outlet 4. The end surface 14a of enlargement 14 carries an annular groove 17 in which is positioned an annular valve face element 18 which may be formed of any suitable compressible material, the outer diameter of valve element 18 being somewhat greater than the diameter of valve seat 10, the valve seat 10 being aligned with the end face of element 18 inwardly adjacent the outer perimeter thereof. A yielding means, such as the spring 20 has one of its ends seated in an inwardly directed annular groove 21 in the end face 2a of cap 2 and its opposite end operative against the rear face 14b of the inwardly extending flange segment 16 of enlargement 14, the outer diameter of spring 20 being substantially equal to the inner diameter 11a of hollow piston 11. Thus the spring 20 is effective to urge valve face 18 toward its seat 10.

A movable valve seat member 25 comprises a major cylindrical or piston-like segment 26 slidable within sub-chamber B and having a circumferential outer wall surface 27 in which a groove 28 is formed to carry a seal 29 in sealing engagement with the inner circumfeerntial wall surface of sub-chamber B. An annular flange 30 is formed on the inner end of member 25 and is positioned for reciprocation within sub-chamber C adjacent its point of communication with sub-chamber B. The larger diameter of sub-chamber C, in comparison with sub-chamber B, produces an annular wall surface 31 in body 1 at the point of communication between sub-chambers B and C. The flange 30 has a rear annular face 32 positioned for abutment against the body surface 31 when the member 25 has reached the end of its travel in one direction, as indicated in FIGURE 3. The flange 30 has a conical continuing end or terminal segment 33 which in turn terminates in an annular valve seat portion 34. The valve seat end portion 34 of member 25 has a diameter less than the diameter of valve seat 10 but greater than the inner diameter of valve face ring 18. The valve seat 34 is positioned in alignment with the valve face 18. A yielding means 35 has one of its ends seated within groove 21 inwardly of spring 20 and its opposite end operative against the end face 36 of member 25 inwardly of flange 30. A central or axial extension 37 is formed on the end face 36 of member 25 and has a diameter such as to fit within the spring 35 and aid in positioning said spring, the spring 35 being thus arranged to urge the member 25 in a direction away from valve face member 18 and to urge flange surface 32 into engagement with limit stop abutment surface 31. The spring 35 extends through the piston 11 and spring 20 in axial alignment therewith. When the member 25 is at the maximum limit of its excursion in the direction in which it is urged by spring 35 the valve seat portion 34 is spaced from valve face 18 and the exhaust outlet 4 and pressure outlet 7 are in communication through sub-chamber C, there being a clear passage through piston 11 and the open coils of springs 20 and 35.

An actuating rod 40 is slidably mounted in a bore 41 formed in body 1 and has an inner end secured to the member 25 as indicated at 42 and an outer end extending from sub-chamber B through bore 41 to a point outside the valve housing or body 1. The outer end 43 of rod has secured thereto a manually operable handle element 44 which may be secured to the rod end 43 in any suitable manner as by the roll pin 45. A mounting surface, such as a vehicle dash board or the like, is indicated generally at 50 and suitable attaching means, for example the elements 51, 52 positioned on opposite sides of the dash 50, may be supplied for mounting the valve of the invention.

Referring now to FIGURE 4, there is illustrated a variant form of the device of the invention in which the seal 29 has been transferred from the larger bore represented by chamber B to the smaller bore 41 through which rod 40 extends, the rod 40 being provided with an annular groove for reception of the seal and the piston 25 has been reduced in axial length. For convenience the groove in handle rod 40 is designated by numeral 28a and the seal has been designated by numeral 29a in FIGURE 4, the piston being designated by numeral 25a. With the seal 29 in contact with the inner wall of chamber B the valve is quite sensitive. In those instances in which inadvertent actuation of handle 44 is an anticipated hazard, the form of FIGURE 4 is effective to reduce the sensitivity of the device of the invention, requiring positive application of increased pressure upon the part of the operator to manually withdraw handle 44 against pressure existing behind the piston valve face of piston 25a.

The use and operation of the invention are as follows:

The mechanism herein disclosed may be employed, for example, in association with a fluid pressure brake system of a vehicle, such as truck-trailer combinations and the like, such pressure operated brake systems normally having an automatic, spring actuated device (not shown) for applying the brakes of the vehicle upon diminution or loss of fluid pressure in the system. The last-mentioned device is normally associated with and adjacent the brake-operating mechanism itself and is therefore downstream of the mechanism herein described.

With the parts positioned as illustrated in FIGURE 3, the outlet 7 is in communication, about the valve seat 34 which is inwardly spaced from valve seat 10 and which has a diameter less than the normal diameter of sub-chamber C, through the hollow piston 11 and the end opening therein defined by the inwardly extending flange segment 16, through the open coils of spring 35 with exhaust outlet 4. As a consequence the brake system is exhausted of fluid pressure and the automatic, spring operated, brake-applying mechanism is caused to apply the brakes. Thus, to apply the vehicle brakes for parking, for example, the operator merely grasps the handle 44 and pulls outwardly thereon to retract the member 25 into the position illustrated in FIGURE 3. When this happens the spring 20 causes the piston 11 to move toward valve seat 10 and to seat valve face element 18 on seat 10. The retraction of member 25 caused separation thereof from the valve face 18 seated upon valve seat 10. The seating of face 18 on seat 10 is effective to seal the inlet 5 against the entry of any fluid pressure into sub-chamber C and the pressure in chamber segment D from inlet 5 is exerted on both sides of flange segment 15, thus canceling any effect on piston 11 due to such pressure when face 18 is on seat 10. The separation of movable valve seat 34 from valve face 18 opens communication between outlet 7 and exhaust 4 to exhaust that part of the system downstream of the body 1. Thus, the operator applies the brake to the vehicle, for parking purposes and the like, upon retraction of the body 25 and the parts will remain in this position until the operator desires to release the parking brake and the parking brake cannot be released without simultaneously charging the regular brake system with adequate pressure.

When the operator wishes to again charge the system and to release the parking brake, it is necessary only that the operator push the handle 44 inwardly or toward the body 1. The end surface 46 of handle 44 will abut the face 47 on body 1 about the bore 41 to limit inward movement of handle 44. The seal 29 will at all times remain in contact with the wall of sub-chamber B due to the limitation in travel of member 25 resulting from such limitation upon travel of handle 44 and rod 43. Before surface 46 abuts face 47, however, the body 25 will be moved toward piston 11 and the movable valve seat 34 will be brought into sealing contact with the valve face member 18 and the member 25 and piston 11 will have been moved a sufficient distance to unseat the valve face member 18 from valve seat 10. The seating of movable valve 34 on member 18 serves to break communication between outlet 7 and exhaust 4 by sealing the entire exhaust passage through piston 11. As the members 25 and 11 are moved together and the valve face member 18 is separated from valve seat 10, a communication is opened between inlet 5 and outlet 7, the fluid pressure entering inlet 5 flowing through passages 6, annular sub-chamber extension D and that portion of sub-chamber C behind or between the lip 34 of member 25 and the point of communication between sub-chamber C and B adjacent which the outlet 7 is in communication with sub-chamber C. Thus is presented to the fluid pressure entering at inlet 5 a substantial annular surface formed of the end face 14a of outward flange segment 15, the portion of valve face member 18 which extends outwardly beyond the lip 34, the conical end segment 33 of member 25, and the rear face of flange 30 thereof. The pressure thus exerted against this substantial annular surface is sufficient to overcome the effect of springs 20 and 35 and to hold the parts in the position to which they were moved by inward movement of handle 44 on the part of the operator, so long as the pressure entering at inlet 5 is maintained at a predetermined satisfactory level. Should the pressure at inlet 5 diminish below a safe predetermined level the spring 20 and 35 are effective to return the parts to the position illustrated in FIGURE 3 and thus to exhaust the system through outlet 7, sub-chamber C, piston 11 and exhaust outlet 4, and thus to cause automatic operation of the brake in response to such diminution of pressure supplied at inlet 5.

The operation of the variant form illustrated in FIGURE 4 is substantially identical to that described above.

Whereas there has been described and illustrated a practical and operative device, nevertheless many changes may be made in size, shape, number and disposition of parts. The description and drawings should therefore be taken as in a broad sense illustrative or diagrammatic, rather than as limiting the invention to the precise showing herein.

What is claimed is:

A valve assembly including a housing, a main chamber in said housing, a hollow cylindrical valve piston slidably mounted in one end of said main chamber, a fixed valve seat at the opposite end of said chamber, an annular chamber surrounding said main chamber and communicating therewith through an annular space between said fixed valve seat and said one end of said main chamber, an annular valve face carried by said hollow piston and having an annular portion extending through said annular space and into said annular chamber, said annular chamber having areas on opposite sides of said annular valve face portion therewithin whereby said annular valve face portion opposite sides are both subjected to pressures within said annular chamber when said valve face is on said fixed seat, a fluid pressure inlet communicating with said annular chamber, a first coil spring within said piston and having its opposite ends in contact with said housing and said piston to urge said piston toward said fixed seat and to urge said valve face against said fixed seat, a movable seat member slidable in said housing and having a seat portion positioned for contact with a portion of said annular valve face within said fixed seat to move said valve face off said fixed seat, said movable seat member having a rod portion extending outwardly of said housing for manual operation of said movable seat member, a second coil spring positioned within and axially aligned with said first coil spring, said second coil spring extending through said first coil spring at all positions of said piston and movable seat, said second coil spring having its opposite ends in contact with said housing and said movable seat member and being operable through said annular valve face to urge said movable seat member away from said valve face, a fluid pressure outlet communicating with said main chamber beyond said fixed seat from said valve face, an exhaust outlet in said housing, said exhaust outlet communicating with the area of said main chamber within said hollow piston, said pressure outlet communicating with said exhaust outlet through said valve face and piston when said valve face is on said fixed seat and said movable seat portion is out of contact with said valve face, said movable seat portion sealing said exhaust outlet against communication with said pressure inlet and outlet when said movable seat portion is in contact with said valve face, a seal between said movable seat member and said housing whereby pressure entering said inlet when said valve face is off said fixed seat and said movable seat portion is in contact with said valve face is effective in one direction only against said housing and in the other direction against said movable seat member to urge said movable seat member against said valve face.

References Cited in the file of this patent

UNITED STATES PATENTS

| | | |
|---|---|---|
| 1,921,092 | Newton | Aug. 8, 1933 |
| 2,717,003 | Jay et al. | Sept. 6, 1955 |
| 2,783,020 | Kleczek | Feb. 26, 1957 |
| 2,896,664 | Lieser | July 28, 1959 |
| 2,896,665 | Lieser | July 28, 1959 |
| 2,923,576 | Seale | Feb. 2, 1960 |
| 2,985,143 | Stelzer | May 23, 1961 |
| 2,991,801 | Larsson | July 11, 1961 |
| 3,042,061 | Dabrikin | July 3, 1962 |
| 3,049,099 | Price | Aug. 14, 1962 |

FOREIGN PATENTS

| | | |
|---|---|---|
| 1,238,932 | France | July 11, 1960 |